US011879803B2

United States Patent
Oda et al.

(10) Patent No.: US 11,879,803 B2
(45) Date of Patent: Jan. 23, 2024

(54) OPTICAL FIBER EVALUATION METHOD AND OPTICAL FIBER EVALUATION APPARATUS

(71) Applicant: NIPPON TELEGRAPH AND TELEPHONE CORPORATION, Tokyo (JP)

(72) Inventors: Tomokazu Oda, Musashino (JP); Hiroyuki Oshida, Musashino (JP); Daisuke Iida, Musashino (JP); Atsushi Nakamura, Musashino (JP); Yuto Sagae, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/926,655

(22) PCT Filed: Jun. 3, 2020

(86) PCT No.: PCT/JP2020/021888
§ 371 (c)(1),
(2) Date: Nov. 21, 2022

(87) PCT Pub. No.: WO2021/245826
PCT Pub. Date: Dec. 9, 2021

(65) Prior Publication Data
US 2023/0144218 A1 May 11, 2023

(51) Int. Cl.
*G01M 11/00* (2006.01)
(52) U.S. Cl.
CPC .................... *G01M 11/39* (2013.01)

(58) Field of Classification Search
CPC .. G01M 11/319; G01M 11/33; G01M 11/331; G01M 11/332; G01M 11/333; G01M 11/334; G01M 11/335; G01M 11/336; G01M 11/337; G01M 11/338; G01M 11/39; G01M 11/02; G01M 11/30;
(Continued)

(56) References Cited

U.S. PATENT DOCUMENTS 8,077,299 B2 * 12/2011 Yamamoto ........ C03B 37/02745
356/73.1
10,760,993 B2 * 9/2020 Maruyama ......... G01D 5/35364
(Continued)

FOREIGN PATENT DOCUMENTS

JP 2018136126 A * 8/2018
JP 2019-105531 A 6/2019
WO WO-2020040019 A1 * 2/2020 ........ G01M 11/0207

OTHER PUBLICATIONS

S. Ohno et al., "Nondestructive Characterization of Differential Mode Delay in Few-mode Fiber Link Using Rayleigh Backscattering Spectral Shifts", Proc. OFC, Th4H.2 (2017).

*Primary Examiner* — Gordon J Stock, Jr.
(74) *Attorney, Agent, or Firm* — Harness, Dickey & Pierce, P.L.C.

(57) ABSTRACT

An optical fiber testing method is presented for measuring the change amount for the wave number k of a Brillouin Frequency Shift v in stimulated Brillouin scattering generated in the same acoustic mode with respect to each target propagation mode. In this way, the ratio of the change amount measured at each propagation mode is acquired as the group delay ratio between the modes.

6 Claims, 2 Drawing Sheets

(58) Field of Classification Search
CPC .............. G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01K 11/322; G01D 5/35364
See application file for complete search history.

(56) References Cited

U.S. PATENT DOCUMENTS

| | | | |
|---|---|---|---|
| 11,378,489 B2* | 7/2022 | Takahashi | H04J 14/04 |
| 2021/0396626 A1* | 12/2021 | Okamoto | G01M 11/0207 |
| 2022/0170817 A1* | 6/2022 | Sagae | G01M 11/3145 |
| 2022/0260454 A1* | 8/2022 | Oda | G01M 11/319 |
| 2022/0381645 A1* | 12/2022 | Nakamura | G01M 11/39 |

* cited by examiner

OPTICAL FIBER EVALUATION METHOD AND OPTICAL FIBER EVALUATION APPARATUS

CROSS-REFERENCE TO RELATED APPLICATIONS

This application is a 371 U.S. National Phase of International Application No. PCT/JP2020/021888, filed on Jun. 3, 2020.

TECHNICAL FIELD

The present invention relates to an optical fiber testing method and an optical fiber testing device for measuring the relative delay between the propagation modes propagating in an optical fiber, in the longitudinal direction and in a distributed manner.

BACKGROUND ART

With the rapid increase in transmission traffic in recent years, Mode-Division Multiplexing (MDM) communication using Few-Mode Fiber (FMF) in which a plurality of spatial modes propagate, has attracted attention. In MDM, where a plurality of modes conduct multiplexing, if there is a large Differential Mode Group Delay (DMD), communication is made difficult. Therefore, it is important to evaluate the mode delay generated in an FMF transmission line. In addition, in designing MDM systems, it is desirable for the delay amount to be evaluable in the longitudinal direction of a fiber and in a distributed manner.

A measurement method using Optical Frequency Domain Reflectometry (OFDR) as a technique for obtaining a DMD in a distributed manner, has been proposed so far (for example, see Non-Patent Literature 1). In this technique, it is utilized that the spectral shift of Rayleigh scattered light is measured in different modes; if there is a DMD, the shift at an apparently different position is observed depending on the size of the DMD. Obtaining the shift amount using OFDR allows for the obtainment of the longitudinal distribution of the DMD with high spatial resolution.

On the other hand, to measure the group delay time of a basic mode in a fiber, a technique for measuring stimulated Brillouin scattering light has been proposed (for example, see Patent Literature 1). This technique obtains a delay time per unit length of a fiber from the frequency shift amount of stimulated Brillouin scattering light and the speed at which an acoustic wave in the fiber propagates. Thus, this makes it possible to evaluate the characteristics of a fiber over a long distance with comparative ease.

CITATION LIST

Patent Literature

Patent Literature 1: Japanese Patent Laid-Open No. 2019-105531

Non-Patent Literature

Non-Patent Literature 1: S. Ohno et al., Proc. OFC, Th4H.2 (2017).

SUMMARY OF THE INVENTION

Technical Problem

However, regarding the technique for obtaining a DMD in a distributed manner using OFDR, a measurable distance depends on the coherence length of the laser used. A laser having a long coherence length is extremely expensive. There is also a problem in that it is difficult to measure a fiber exceeding 100 km, even when a laser with excellent characteristics is used.

In addition, the technique of Patent Literature 1 that measures stimulated Brillouin scattering light, determines the speed of the acoustic wave in a fiber from the amounts of Germanium dioxide ($GeO_2$) and Fluorine (F) added to the core. However, there is a problem in that it is difficult to apply the technique of Patent Literature 1 to a fiber for which amounts of the additive cannot be grasped in advance.

Therefore, to solve the above problems, the present invention has an object to provide an optical fiber testing method and an optical fiber testing device capable of measuring the delay ratio between the modes at each position of a fiber over a long distance in which a plurality of modes propagate.

Means for Solving the Problem

In order to achieve the above object, an optical fiber testing method and its device according to the present invention, measure the change amount for the wave number k of a Brillouin Frequency Shift ν in stimulated Brillouin scattering generated in the same acoustic mode, with respect to each target propagation mode. Thereby, the ratio of the change amount measured at each propagation mode is acquired as the group delay ratio between the modes.

Specifically, an optical fiber testing method according to the present invention is an optical fiber testing method for evaluating a group delay ratio between the modes of an optical fiber to be measured, the method including:
  measuring a change amount for wave number in a Brillouin Frequency Shift for each two propagation modes having the same acoustic mode excited when stimulated Brillouin scattering occurs; and
  calculating a ratio of the change amount for each of the propagation modes as the group delay ratio between the modes.

In addition, an optical fiber testing device according to the present invention is an optical fiber testing device for evaluating a group delay ratio between the modes of an optical fiber to be measured, the device including:
  a measuring instrument for measuring a change amount of wave number in a Brillouin Frequency Shift for each two propagation modes having the same acoustic mode excited when stimulated Brillouin scattering occurs; and
  a calculator for calculating the ratio of the change amount for each of the propagation modes as the group delay ratio between the modes.

Even if the amount of impurities added to the core is unknown, so is unknown the sound speed of acoustic mode, the unknown can be removed by obtaining the change amount of the delay time for wave number in the Brillouin Frequency Shift (BFS) of the respective two propagation modes and calculating the ratio thereof. Thus, the present invention can provide an optical fiber testing method and an optical fiber testing device capable of measuring the delay ratio between the modes at each position of a fiber over a long distance in which a plurality of modes propagate.

The specific measurement method is as follows.
The measuring instrument is configured to:
  allow probe light and pump light having a given wave number to enter the optical fiber to be measured for each of the propagation modes, thereby obtaining a Brillouin Frequency Shift amount;

allow probe light and pump light having a different wave number different from the given optional wave number to enter the optical fiber to be measured for each of the propagation modes, thereby obtaining a Brillouin Frequency Shift amount; and determine the difference between the Brillouin Frequency Shift amount for the given wave number and the Brillouin Frequency Shift amount for the different wave number for each of the propagation modes, as the change amount.

The specific calculation method is as follows.

The calculator calculates the ratio of the change amount by Expression C1.

[Math. C1]

$$\frac{\tau_m}{\tau_n} = \frac{dv_{Bm}/dk}{dv_{Bn}/dk} \quad (C1)$$

wherein $\tau_m$ and $\tau_n$ represent the group delay times of the modes per unit length in the optical fiber to be measured in the propagation modes of LPm and LPn, respectively; $\tau_m/\tau_n$ represents the ratio of the change amount; and $v_{Bm}$ and $v_{Bn}$ represent the Brillouin Frequency Shift amounts generated in the propagation modes of LPm and LPn, respectively.

Effects of the Invention

The present invention can provide an optical fiber testing method and an optical fiber testing device capable of measuring the delay ratio between the modes at each position of a fiber over a long distance in which a plurality of modes propagate.

DESCRIPTION OF EMBODIMENTS

Figure 1:
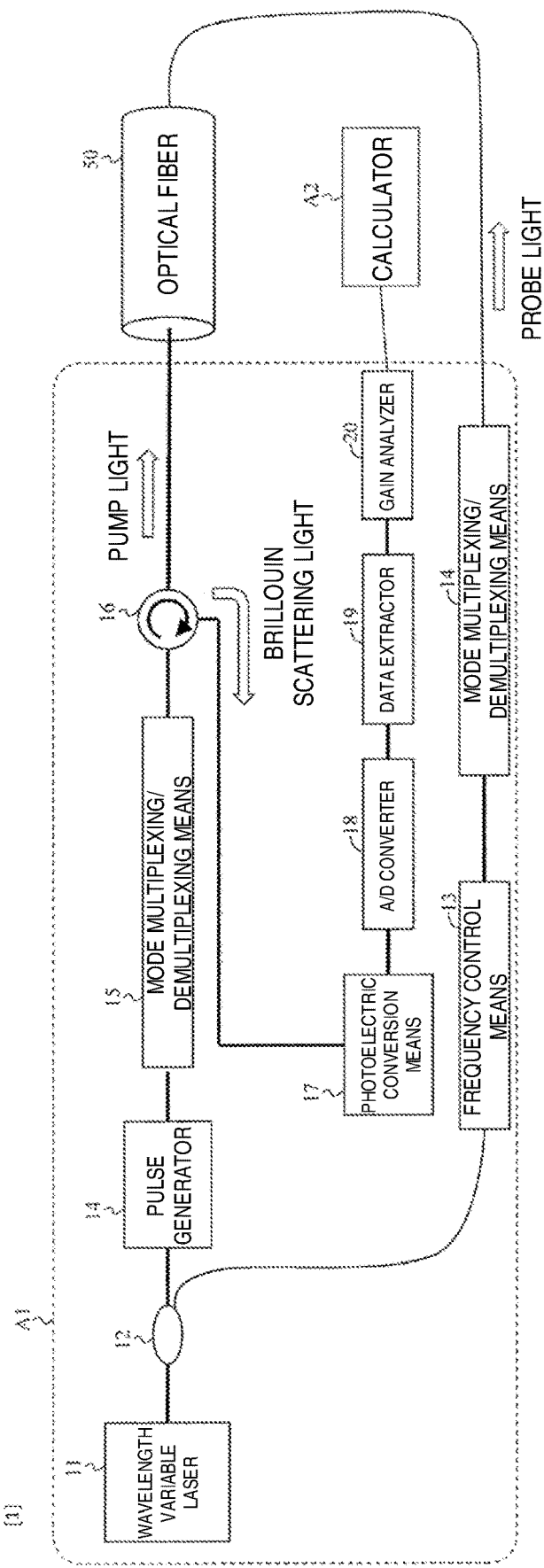
FIG. 1 is an illustration explaining an optical fiber testing device according to the present invention.

Embodiments of the present invention are described with reference to the accompanying drawings. The embodiments described hereinafter are the examples of the present invention. Furthermore, the present invention should not be limited to the following embodiments. It is also understood that throughout this specification and in the drawings, components with the same reference sign refer to the same as each other.

(Principle of the Invention)

In the present invention, a Brillouin Frequency Shift amount of stimulated Brillouin scattering light generated in a fiber, is measured. Here, measuring the change in the Brillouin Frequency Shift amount with respect to the wavelength of incident light in the two modes to be compared, enables the acquisition of the delay amount ratio between the modes.

The derivation process of the delay amount ratio between the modes is shown below. The delay time $\tau_i$ of mode i per unit length in an optical fiber is represented by

[Math. 1]

$$\tau_i = \frac{1}{c}\frac{d\beta_i}{dk} \quad (1)$$

wherein $\beta_i$ is the propagation constant of $LP_i$ mode; c is the propagation speed of light in vacuum; and k is the wave number of light. Further, the frequency shift amount $v_{Bi}$ of Brillouin scattering light generated in $LP_i$ mode by both pump light and probe light is represented by

[Math. 2]

$$v_{Bi} = \frac{V_{Aj}}{\pi}\beta_i \quad (2)$$

wherein the $V_{Aj}$ is the sound speed of acoustic mode $L_j$. If it is assumed that the wavelength dependence of $V_{Aj}$ is sufficiently small compared to $\beta_i$, the delay time $\tau_i$ using Expression (1) and Expression (2), can be represented by the following expression.

[Math. 3]

$$\tau_i = \frac{\pi}{cV_{Aj}}\frac{dv_{Bi}}{dk} \quad (3)$$

Expression (3) shows that the delay time per unit length of $LP_i$ mode is determined by the wave number dependence of $v_{Bi}$ and the sound speed of the excited acoustic mode $L_j$.

Next, for simplicity, consider the case where only two modes, $LP_{01}$ and $LP_{11}$, propagate to acquire the delay ratio of these modes. The stimulated Brillouin scattering in a fiber is generated by an interaction between the $LP_i$ mode of pump light and probe light and the excited acoustic mode $L_j$. In other words, there are two interactions. One is an interaction between pump light and probe light of $LP_{01}$ and acoustic wave of $L_j$. The other is an interaction between pump light and probe light of $LP_{11}$ and acoustic wave of $L_j$.

From Expression (3), a delay time is changed depending on the excited acoustic mode. Here, considering the case where the same acoustic mode $L_j$ is excited between $LP_{01}$ modes and between $LP_{11}$ modes, the ratio $\tau_{11}/\tau_{01}$ of the delay time of each mode is represented as follows.

[Math. 4]

$$\frac{\tau_{11}}{\tau_{01}} = \frac{dv_{B11}/dk}{dv_{B01}/dk} \quad (4)$$

From Expression (4), even when the sound speed of acoustic mode is unknown, $\tau_{11}/\tau_{01}$ can be derived from the change amount in the wave number of the Brillouin Frequency Shift (BFS) of $LP_{01}$ and $LP_{11}$. Specifically, measuring the change amount of BFS when the wavelength that is made incident is changed for each mode, makes it possible to acquire $\tau_{11}/\tau_{01}$. The BFS in a fiber can be obtained in the longitudinal direction of the fiber and in a distributed manner, thereby acquiring the delay time ratio at any position from Expression (4). Furthermore, the present invention is applicable to the LP mode having any order, if the condition that stimulated Brillouin scattering is generated by the same acoustic mode is met.

Embodiment

Hereinafter, an example of an optical fiber testing device of the present embodiment is described. As described in Expression (4), it is preferable that the change amount of BFS for the wave number of incident light is obtained for each mode by using the optical fiber testing device. As a measurement method, such as Brillouin Optical Time Domain Reflectometry (BOTDR), Brillouin Optical Time Domain Analysis (BOTDA), or Brillouin Optical Correlation Domain Analysis (BOCDA) for obtaining a BFS in the longitudinal direction and in a distributed manner, has been proposed. However, in the present invention, means for measurement may be anything, if a BFS can be measured. The example of a case using BOTDA, is described below.

FIG. 1 is an illustration explaining an optical fiber testing device of the present embodiment. The optical fiber testing device is an optical fiber testing device for evaluating the group delay ratio between the modes of an optical fiber to be measured 50, the device including:

- a measuring instrument A1 for measuring a change amount of wave number in the Brillouin Frequency Shift for each two propagation modes having the same acoustic mode excited when stimulated Brillouin scattering occurs; and
- a calculator A2 for calculating the ratio of the change amount for each of the propagation modes as the group delay ratio between the modes.

The measuring instrument A1 serves to allow pump light and probe light with different frequency to enter from both ends of the optical fiber 50, thereby measuring the BFS of the Brillouin gain generated from light collision. The light outputted from a laser light source 11 generating coherent light is converted to a desired wavelength by means for varying wavelength and is branched into two by a branching element 12. At this time, when the light source 11 is a wavelength variable laser which can control wavelength, the means for varying wavelength is not required. FIG. 1 illustrates a case when a wavelength variable laser is used as the light source 11.

One of the lights branched into two by the branching element 12 is pulsed by a pulse generator 14 and is converted from a basic mode to a desired propagation mode by a mode multiplexer/demultiplexer 15. Then, the light enters one end of the optical fiber to be measured 50, as pump light. A frequency difference (approximately 10 GHz to 11 GHz) equivalent to the Brillouin Frequency Shift corresponding to the combination of pump light and probe light modes is imparted to the other of the lights branched into two by the branching element 12 by an optical frequency controller 13. Then, the light is converted from the basic mode to the same propagation mode as pump light by a mode multiplexer/demultiplexer 14. The light then enters the other end of the optical fiber to be measured 50, as probe light. For the optical frequency controller 13, Single Side Band (SSB) modulator or the like, which is composed of $LiNb_3$, may be used, as an external modulator. Alternatively, as the optical frequency controller 13, lasers with different frequencies (wavelengths) may be used to generate pump light and probe light. Then, the optical frequency difference between the two lasers may be controlled.

In the optical fiber to be measured 50, a Brillouin gain is generated in the probe light due to the collision between the pump light and the probe light. The probe light amplified by the pump light is outputted from one end of the optical fiber to be measured 50 and is transmitted to a photoelectric converter 17 by an optical circulator 16. The photoelectric converter 17 converts the probe light intensity into an electric signal. The electric signal is converted into digital data by an A/D converter 18, and a data extractor 19 then extracts desired data from the digital data. A gain analyzer 20 analyzes the gain from this data.

In the specific analysis of Brillouin gain, the reference intensity of probe light in a case where pump light does not enter, is obtained. Then, signal intensity when pump light and probe light enter, is acquired. Calculating the increased amount of the reference intensity from the signal intensity makes it possible to obtain a Brillouin gain. This measurement is repeated by changing the frequency difference between the pump light and the probe light, so that the Brillouin gain spectrum corresponding to the incidence mode and the characteristics of the fiber to be measured can be obtained. Then, extracting the frequency difference whose gain becomes maximum from this spectrum allows a BFS to be obtained.

The measuring instrument A1 obtains the change amount of the BFS with respect to wave number (wavelength) of incident light for each two propagation modes for which the delay amount is to be compared. Here, depending on the type of the optical fiber 50, a plurality of acoustic modes may be excited, and a plurality of BFSs corresponding to the number of acoustic modes may be observed. In the present invention, it is necessary to obtain the BFS generated in the same acoustic mode. For example, when the modes to be compared are $LP_{01}$ and $LP_{11}$, the acoustic mode excited for both between $LP_{01}$ modes and between $LP_{11}$ modes, is used. The acoustic mode and BFS generated from the mode can be determined by the Brillouin gain spectrum obtained by the overlap integral of refractive index distribution of the fiber to be measured, electric field distribution of LP mode derived by a material to be added, and acoustic wave distribution in L mode. Specifically, acoustic mode can be extracted by comparing the measured Brillouin gain spectrum with the Brillouin gain spectrum calculated by calculation in advance using these parameters. Then, operation of searching the acoustic mode common to each propagation mode from the extracted acoustic modes is performed.

Figure 2:
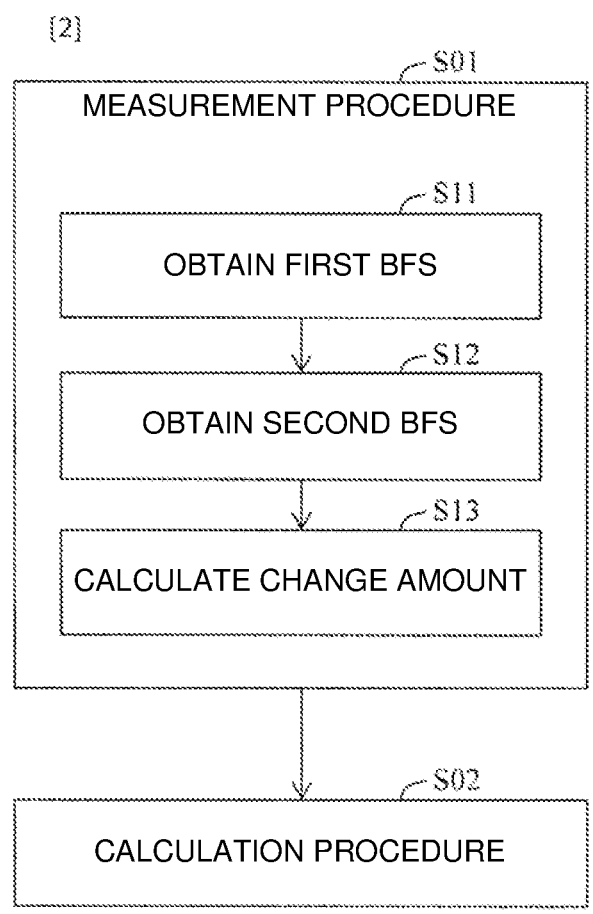
FIG. 2 is an illustration explaining an optical fiber testing method according to the present invention.

FIG. 2 is an illustration explaining an optical fiber testing method by an optical fiber testing device. The optical fiber testing method is an optical fiber testing method for evaluating the group delay ratio between the modes of an optical fiber to be measured 50, the method including:

measuring a change amount for wave number in the Brillouin Frequency Shift for each two propagation modes having the same acoustic mode excited when stimulated Brillouin scattering occurs (step S01); and calculating the ratio of the change amount for each of the propagation modes as the group delay ratio between the modes (step S02).

Here, step S01 includes:

allowing probe light and pump light having a given wave number to enter the optical fiber to be measured 50 for each of the propagation modes, thereby obtaining a Brillouin Frequency Shift amount (step S11);

allowing probe light and pump light having a different wave number different from the given wave number to enter the optical fiber to be measured 50 for each of the propagation modes, thereby obtaining a Brillouin Frequency Shift amount (step S12); and determining the difference between the Brillouin Frequency Shift amount for the given wave number and the Brillouin Frequency Shift amount for the different wave number for each of the propagation modes, as the change amount (step S13).

Specifically, first, the mode multiplexers/demultiplexers (14, 15) set both the pump light and probe light modes to $LP_{01}$ or $LP_{11}$. The BFS is then measured using the gain analyzer 20. That is, step S11 includes:

1. converting the mode of pump light and probe light to one of the modes to be compared.
2. obtaining a BFS ($v_{Bm}$) in the incidence mode.

Next, step S12 includes:

3. converting the mode of pump light and probe light to the other of the modes to be compared.
4. obtaining a BFS ($v_{Bn}$) by the same acoustic mode in which a BFS is generated in step S11.

Then, step S13 is performed. That is, the wave number of the light incident on the fiber is changed, and the BFS of each mode is measured in the same manner as in steps S11 and S12. Then, the gain analyzer 20 obtains the change amount ($dv_{Bm}/dk$ and $dv_{Bn}/dk$) in the BFS with respect to the wave number of the incident light for each propagation mode.

Finally, the calculator A2 performs step S02. That is, the calculator A2 substitutes the BFS change amount for each propagation mode obtained in step S13 into Expression (4) to acquire the ratio ($\tau_m/\tau_n$) of the delay time of each mode.

Another Embodiment

The optical fiber testing device described in the above embodiments can also be realized by a computer and a program. The device can also record the program on a recording medium or provide the program through a network.

(Effect)

According to the present invention, the change amount for the wavelength of incident light in the frequency shift amount of the stimulated Brillouin scattering light in a fiber is measured for each propagation mode. Then, the delay amount ratio of each mode propagating in the optical fiber to be measured, is acquired. The present invention achieves measurement of the delay amount ratio at any position, even if the speed of acoustic wave in a fiber is unknown.

REFERENCE SIGNS LIST

11 Light source
12 Branching element
13 Frequency controller
14 Mode multiplexer/demultiplexer
15 Mode multiplexer/demultiplexer
16 Optical circulator
17 Photoelectric converter
18 A/D converter
19 Data extractor
20 Gain analyzer
50 Optical fiber to be measured
A1 Measuring instrument
A2 Calculator

The invention claimed is:

1. An optical fiber testing method for evaluating a group delay ratio between modes of an optical fiber to be measured, the method comprising:
measuring a change amount for wave number in a Brillouin Frequency Shift for each two propagation modes having same acoustic mode excited when stimulated Brillouin scattering occurs; and
calculating a ratio of the change amount for each of the propagation modes as the group delay ratio between the modes.

2. The optical fiber testing method according to claim 1, wherein when the change amount is measured, the method comprises:
allowing probe light and pump light having a given wave number to enter the optical fiber to be measured for each of the propagation modes, thereby obtaining a Brillouin Frequency Shift amount;
allowing probe light and pump light having a different wave number different from the given wave number to enter the optical fiber to be measured for each of the propagation modes, thereby obtaining a Brillouin Frequency Shift amount; and
determining a difference between the Brillouin Frequency Shift amount for the given wave number and the Brillouin Frequency Shift amount for the different wave number for each of the propagation modes, as the change amount.

3. The optical fiber testing method according to claim 1, wherein when the ratio of the change amount is calculated, the ratio is calculated by Expression C1,

[Math. C1]

$$\frac{\tau_m}{\tau_n} = \frac{dv_{Bm}/dk}{dv_{Bn}/dk} \tag{C1}$$

wherein $\tau_m$ and $\tau_n$ represent group delay times of the modes per unit length in the optical fiber to be measured in the propagation modes of LPm and LPn, respectively;
$\tau_m/\tau_n$ represents the ratio of the change amount; and $v_{Bm}$ and $v_{Bn}$ represent the Brillouin Frequency Shift amounts generated in the propagation modes of LPm and LPn, respectively.

4. An optical fiber testing device for evaluating a group delay ratio between modes of an optical fiber to be measured, the device comprising:
a measuring instrument for measuring a change amount of wave number in a Brillouin Frequency Shift for each two propagation modes having the same acoustic mode excited when stimulated Brillouin scattering occurs; and
a calculator for calculating a ratio of the change amount for each of the propagation modes as the group delay ratio between the modes.

5. The optical fiber testing device according to claim 4, wherein the measuring instrument
allows probe light and pump light having a given wave number to enter the optical fiber to be measured for each of the propagation modes, thereby obtaining a Brillouin Frequency Shift amount;
allows probe light and pump light having a different wave number different from the given wave number to enter the optical fiber to be measured for each of the propagation modes, thereby obtaining a Brillouin Frequency Shift amount; and
determines a difference between the Brillouin Frequency Shift amount for the given wave number and the Brillouin Frequency Shift amount for the different wave number for each of the propagation modes, as the change amount.

6. The optical fiber testing device according to claim 4, wherein the calculator calculates the ratio of the change amount by Expression C1,

[Math. C1]

$$\frac{\tau_m}{\tau_n} = \frac{dv_{Bm}/dk}{dv_{Bn}/dk} \quad (C1)$$

wherein $\tau_m$ and $\tau_n$ represent group delay times of the modes per unit length in the optical fiber to be measured in the propagation modes of LPm and LPn, respectively;

$\tau_m/\tau_n$ represents the ratio of the change amount; and $v_{Bm}$ and $v_{Bn}$ represent the Brillouin Frequency Shift amounts generated in the propagation modes of LPm and LPn, respectively.

\* \* \* \* \*